US008665506B2

(12) United States Patent
Moidu

(10) Patent No.: US 8,665,506 B2
(45) Date of Patent: Mar. 4, 2014

(54) MICRO-MIRROR WITH ELECTRODE SPACER

(75) Inventor: Abdul Jaleel K. Moidu, Nepean (CA)

(73) Assignee: JDS Uniphase Corporation, Milpitas, CA (US)

(*) Notice: Subject to any disclaimer, the term of this patent is extended or adjusted under 35 U.S.C. 154(b) by 279 days.

(21) Appl. No.: 12/969,669

(22) Filed: Dec. 16, 2010

(65) Prior Publication Data

US 2011/0149361 A1 Jun. 23, 2011

Related U.S. Application Data

(60) Provisional application No. 61/289,473, filed on Dec. 23, 2009.

(51) Int. Cl.
G02B 26/08 (2006.01)
G02B 26/10 (2006.01)

(52) U.S. Cl.
CPC ............ G02B 26/0841 (2013.01); G02B 26/10 (2013.01); G02B 26/105 (2013.01)
USPC ................... 359/198.1; 359/200.6; 359/212.1

(58) Field of Classification Search
USPC .......... 359/198.1–199.4, 200.6–200.8, 202.1, 359/221.2, 223.1–225.1, 226.2, 904, 359/290–295, 838, 846, 871, 872; 250/204, 250/559.06, 559.29, 230, 234; 347/255–260; 353/39, 98–99; 385/15–18, 22; 398/12, 19, 45
See application file for complete search history.

(56) References Cited

U.S. PATENT DOCUMENTS

| 6,491,404 | B2 * | 12/2002 | Hill ................................ 359/872 |
| 6,704,132 | B2 | 3/2004 | Dewa ............................ 359/290 |
| 6,791,730 | B2 | 9/2004 | Sniegowski et al. ........ 359/223.1 |
| 6,956,684 | B2 | 10/2005 | Orcutt ......................... 359/199.1 |
| 6,999,215 | B2 | 2/2006 | Dewa et al. ................. 359/198.1 |
| 7,002,719 | B2 | 2/2006 | Tran ............................ 359/223.1 |
| 7,050,211 | B2 | 5/2006 | Orcutt ......................... 359/224.1 |
| 7,071,109 | B2 * | 7/2006 | Novotny et al. .............. 438/692 |
| 7,259,900 | B2 | 8/2007 | Orcutt ......................... 359/224.1 |
| 2001/0022682 | A1 * | 9/2001 | McClelland et al. .......... 359/280 |
| 2004/0081391 | A1 * | 4/2004 | Ko et al. .......................... 385/18 |
| 2004/0150872 | A1 * | 8/2004 | Neukermans et al. ......... 359/291 |

(Continued)

OTHER PUBLICATIONS

Kaiser, Todd J., et al, "Silicon Nitride Biaxial Pointing Mirrors with Stiffening Ribs", Moems and Miniaturized Systems II, San Francisco, CA Oct. 22-24, 2001, Proceedings of the SPIE—The International Society for Optical Engineering, 2001, SPIE-INT Soc. Opt. Eng. pp. 276-282.

(Continued)

Primary Examiner — Alicia M Harrington
Assistant Examiner — Cara Rakowski
(74) Attorney, Agent, or Firm — Teitelbaum & MacLean; Neil Teitelbaum; Doug MacLean

(57) ABSTRACT

A micro-mirror includes stiffer end sections for limiting curvature, and thin middle sections forming ground electrodes and a hinge. Spacers are provided beneath the thin middle sections of the micro-mirror for supporting hot electrodes, which attract the ground electrodes for rotating the micro-mirror about a tilt axis. The spacers enable the gap between the hot electrode and the micro-mirror to be designed separately from the thickness of the micro-mirror, and the gap between the ends of the micro-mirror and the substrate.

12 Claims, 7 Drawing Sheets

(56) References Cited

U.S. PATENT DOCUMENTS

| | | | |
|---|---|---|---|
| 2005/0041916 A1* | 2/2005 | Miller et al. | 385/18 |
| 2005/0139542 A1 | 6/2005 | Dickensheets et al. | 210/490 |
| 2006/0210238 A1* | 9/2006 | Ma et al. | 385/147 |
| 2008/0018975 A1 | 1/2008 | Moidu | 359/226.1 |
| 2009/0290205 A1* | 11/2009 | Satoh et al. | 359/199.2 |
| 2010/0290142 A1* | 11/2010 | Krastev et al. | 359/872 |

OTHER PUBLICATIONS

Lutzenberger, Jeffrey, et al, "Vertical stiffening Members for Flatness Control of Surface Micromachined Structures", Moems and Miniaturized Systems II San Francisco, CA Oct. 22-24, 2001, Proceedings of the SPIE—The International Society for Optical Engineering, 2001, SPIE-INT Soc. Opt. Eng. pp. 238-246.

Lin, Hung-Yi, et al, "Rib-Reinforced Micromachined Beam and its Applications", Journal of Micromeclianics and Microengineering, Mar. 2000, vol. 10, No. 1 pp. 93-99.

Mita, Makkoto, et al, "An Out-of-Plane Potysilicon Actuator with a Smooth Vertical Mirror for Optical Fiber Switch Application", Broadband Optical Networks and Technologies: An Emerging Reality/Optical MEMS/Smart Pixels/Organic Optics and Optoelectronics, 1998 IEEE/Leos Summer topical Meetings Monterey, CA Jul. 20-24, 1998, New York NY IEEE pp. II-33-II-34.

Nee, Jocelyn T., et al, "Stretched-Film Micromirrors for Improved Optical Flatness", 2000 Ieee, pp. 704-709.

Himmer, Phillip A., et al, "Micromachined Silicon Nitride deformable Mirrors for Focus Control", Optics Letters, Optical Society of America, Washington, vol. 26, NR. 16 pp. 1280-1282.

Nee, Jocelyn T., et al, "Lightweight, Optically Flat Micromirrors for Fast Beam steering", 2000 IEEE/Leos International conference on Optical MEMS (cat. No. 00EX399), 2000 IEEE/LEOS International Conference on Optical MEMS, Kauai, HI, pp. 21-24 Aug. 2000, Piscataway NJ IEEE, pp. 9-10.

* cited by examiner

MICRO-MIRROR WITH ELECTRODE SPACER

CROSS-REFERENCE TO RELATED APPLICATIONS

The present invention claims priority from U.S. Patent Application No. 61/289,473 filed, Dec. 23 2009, which is incorporated herein by reference.

TECHNICAL FIELD

The present invention relates to a micro-mirror device, and in particular to a MEMS micro-mirror device with an electrode spacer enabling the gap between hot and ground electrodes to be independent of any other stiffening structures.

BACKGROUND OF THE INVENTION

Conventional micro-electro-mechanical (MEMs) micro-mirror devices 1, illustrated in FIG. 1, comprise a mirror platform 2, suspended above a substrate 3 via hinges 4 and cap 5. One or more pedestals 7, extend upwardly from the substrate 3 in the middle or on each side of the mirror platform 2 for supporting ends of the hinges 4. A reflective coating 6 (typically metallic) is disposed on the top surface of the mirror platform 2 for redirecting optical signals in dependence upon the tilt angle of the mirror platform 2 relative to the substrate 3. Residual stresses in the reflective coating 6 introduces a mirror curvature in the mirror platform 2, which adversely affects optical performance. Moreover, any change in the curvature of the mirror platform 2, e.g. due to metal stress relaxation, affects reliability. Therefore, stiffening the mirror platform 2 is highly desirable to control stress-induced mirror curvature.

Typically, as illustrated in FIG. 1, the mirror platform 2, the hinge 4 and the cap 5 have a uniform thickness, whereby the aforementioned structures can be formed, e.g. etched, in a single etching step, and mounted on the raised pedestal 7 extending from the substrate 3. Hot electrodes 8 are positioned beneath each side of the mirror platform 2 for selectively attracting the underside of the mirror platform 2, which act as ground electrodes, for tilting the mirror platform 2, as desired, e.g. for switching optical signals. The tolerance of the thickness of the mirror platform/hinge affects the stiffness of the hinge 4, and also affects the electrode gap 9 between the hot electrode 8 and ground electrode, i.e. the underside of the mirror platform 2. The tolerance of the electrode gap 9 determines the variation of the driving torque generated for a given voltage applied to the hot electrode 8. The advantage of the design shown in FIG. 1 is a self-compensating effect from the etch depth, whereby an increase in hinge stiffness due to a smaller etch depth, i.e. a thicker hinge 4, is compensated by an increase in the electrostatic force from a smaller electrode gap 9, as a result of the smaller etch depth. The etch depth compensation reduces the voltage variation of the device due to etch depth tolerance. Unfortunately, there are several drawbacks to the conventional structure, which include:

1) A limited scope to improve the stiffness of the mirror platform 2; i.e. since the mirror platform 2 has a uniform rectangular shape, only the thickness of the mirror platform 2 can be adjusted to improve the mass moment of inertia (MOT) thereof, and the mechanical resonance thereof.

2) The process considerations for the width of the hinge 4 puts an upper limit on the thickness of the mirror platform 2, i.e. the stiffness of the mirror platform 2, since the hinge 4 has the same thickness as the mirror platform 2.

3) The mirror swing space for tilt is determined by the electrode gap, thereby constraining the electrode design by the swing space requirement and vice versa.

An object of the present invention is to overcome the shortcomings of the prior art by providing a micro-mirror structure that provides additional mirror stiffness, while maintaining the compensation of hinge stiffness by electrode gap, by means of an electrode spacer.

SUMMARY OF THE INVENTION

Accordingly, the present invention relates to a micro-mirror device comprising:

a substrate defining a lower level;

a first spacer extending upwardly from the substrate forming an upper level;

an anchor post extending upwardly from the substrate or the spacer;

a tilting platform pivotally connected to the anchor post above the substrate via a hinge defining a tilting axis, the tilting platform including a first thin section above the upper level of the substrate, and a stiffer section at each end thereof including stiffening ribs in a lower surface thereof above the lower level of the substrate defining a swing space therebetween; and a first hot electrode on the first spacer below the first thin section defining an electrode gap for pivoting the tilting platform about the tilting axis; and whereby tolerance variations in hinge thickness are at least partially compensated for by a corresponding variation in electrode gap; and whereby the swing space is independent of the electrode gap Another aspect of the present invention relates to a method of manufacturing a micro-mirror device comprising:

a) providing a substrate defining a lower level;

b) providing a first spacer on the substrate defining an upper level;

c) providing an anchor post extending from the first spacer or the substrate;

d) providing a first hot tilt electrodes on the first spacer;

e) providing a tilting mirror platform with a thinner middle section including a hinge and a ground electrode, and stiffer end sections with a reflective coating on at least one of the end sections; and f) mounting the tilting mirror platform with ground electrode over the hot tilt electrode, and the stiffer end sections over the lower level.

BRIEF DESCRIPTION OF THE DRAWINGS

The invention will be described in greater detail with reference to the accompanying drawings which represent preferred embodiments thereof, wherein.

DETAILED DESCRIPTION

Figure 1:
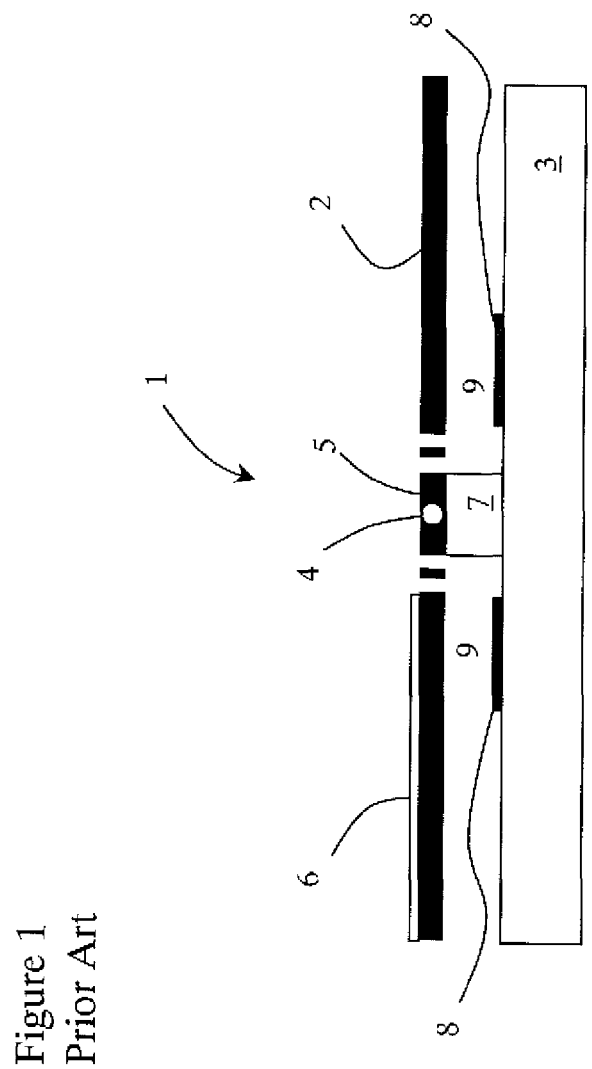
FIG. 1 is a cross-sectional view of a conventional micro-mirror device.
Figure 2:
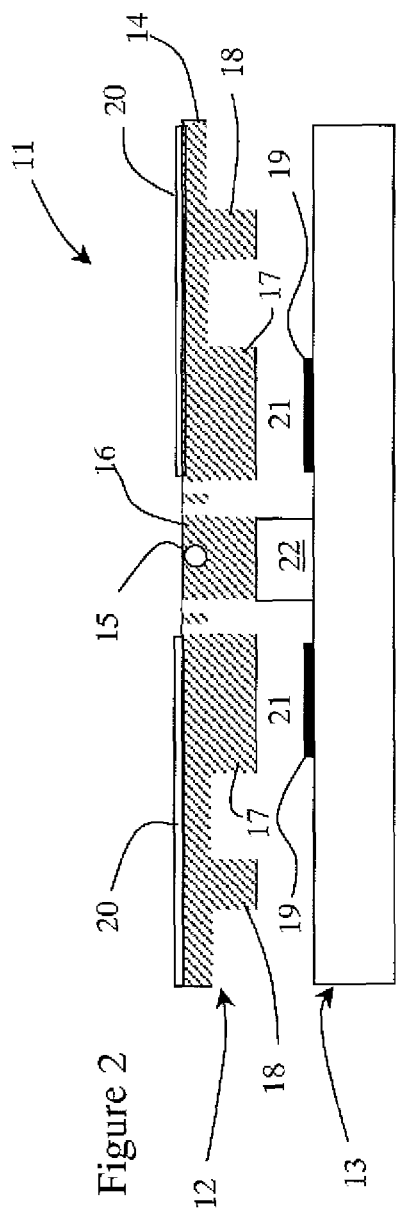
FIG. 2 is a cross-sectional view of a micro-mirror device in accordance with the present invention.
Figure 3:
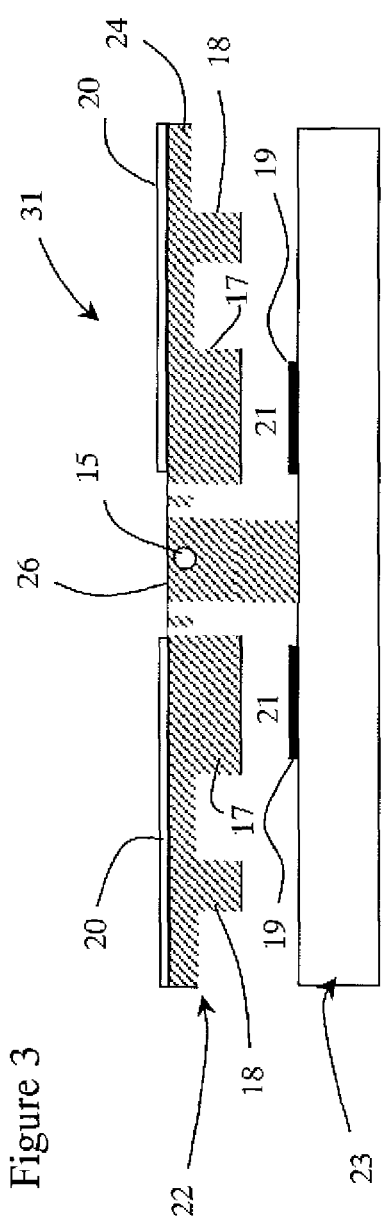
FIG. 3 is a cross-sectional view of another embodiment of a micro-mirror device in accordance with the present invention.

With reference to FIGS. 2 and 3, a micro-mirror device 11 in accordance with the present invention includes a mirror wafer 12 and a substrate wafer 13. The mirror wafer 12 includes a mirror platform 14, a hinge 15 and a pedestal cap 16. One end of the hinge 15 extends from the mirror platform 14, and the other end of the hinge 15 extends from the pedestal cap 16. The pedestal cap 16 can be a single element disposed at the intersection of the longitudinal and lateral central axes of the mirror platform 14 or a pair of elements disposed on opposite sides of the mirror platform 14 along the lateral or tilt axis of the mirror platform 14. Stiffening bulkheads 17 and 18 are provided on the underside of each side of the mirror platform 14 to increase the stiffness thereof, and therefore decrease the curvature thereof. The bulkheads 17 and 18 can be laterally extending structures, longitudinally extending ribs, or a combination of both, e.g. longitudinally extending ribs extending from laterally extending structures.

In a first embodiment, the mirror wafer 12 is formed in a single-step backside etching process. The etching step forms the pattern of bulkheads 17 and 18 and the pedestal cap 16, along with defining the thickness of the main section of the mirror platform 14. The pattern of the bulkheads 17 and 18 on the underside of the mirror platform 14 provides the required stiffness, and at the same time removes most of the material for mass reduction. A final top-side etch step is conducted to pattern and etch the hinge 15, ideally after the pedestal cap 16 is mounted on the substrate wafer 13.

One or more hot electrodes 19 are disposed on the substrate wafer 13 below the bulkheads 17 for selectively attracting the underside of the bulkheads 17, which act as ground electrodes, for tilting the mirror platform 14, as desired, e.g. for switching optical signals. A single hot electrode 19 can provide limited angular control; however, two or more hot electrodes 19 are preferred to ensure better control and a greater range of angular motion. Ideally, a reflective surface 20 is disposed, e.g. coated, on an upper surface of the mirrored platform 14 on one or both sides of the hinge 15 for reflecting optical signals. Each of the hot electrodes 19 are electrically connected to an adjustable voltage source (not shown) for generating the required amount of voltage to tilt the mirror platform 14 relative to the substrate wafer 13 producing a desired angular position. One or two pedestals 22 extend from the substrate wafer 13 for supporting the one or two pedestal caps 16.

In this case the electrode gap 21 and the thickness of the hinge 15 are independently formed by etching the mirror wafer in two steps: a first backside etch to define the pedestal cap 16 and the bulkheads 17 and 18, and then a second topside etch to define the hinge 15. Any change in the driving torque due to a variation in the electrode gap 21 is decoupled from the stiffness of the hinge 15, and therefore lacks the compensation effect of the hinge stiffness by the electrode gap due to an etch depth tolerance. However, the pedestal 22 does provide a stiffened mirror beam structure. It will be shown later how a spacer design allows a stiffened beam with a compensated electrode gap.

In an alternate embodiment, illustrated in FIG. 3, a micro-mirror 31 with several similar elements to micro-minor 11 includes a mirror wafer 22 is formed in a two-step backside etch process. In a first step a pedestal cap 26 is patterned and formed, providing complete support for the mirror wafer 22 above the substrate wafer 23, without need of the pedestal 22. The thickness of the bulkheads 17 and 18 are also thereby defined providing the electrode gap 21 distance. In a second step, the bulkheads 17 and 18 are patterned and etched, providing the stiffness requirements of the mirror platform 24. The depth of the second step etch also dictates the thickness of the rest of the mirror platform 24 and the hinge 15, although an additional step can be added to adjust the thickness of either the mirror platform 24 or the hinge 15 independent of each other. A final topside etching step is provided to define the hinge 15 extending form the pedestal cap 26.

Figure 4:
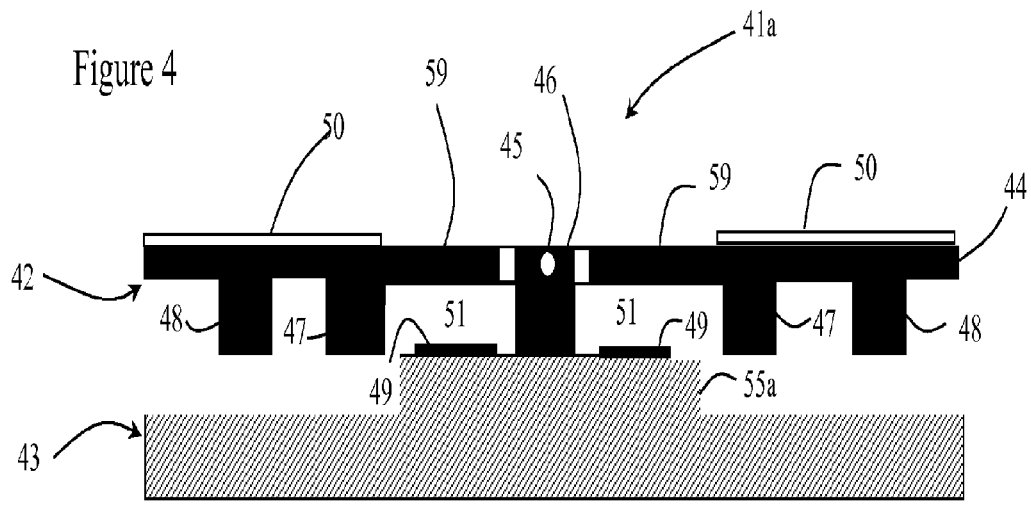
FIG. 4 is a cross-sectional view of another embodiment of a micro-mirror device in accordance with the present invention.

FIG. 4 illustrates a preferred embodiment of the present invention, in which a micro-mirror device 41a includes a mirror wafer 42 and a substrate wafer 43. The mirror wafer 42 includes a tilting mirror platform 44, a hinge 45 and a pedestal mounting cap 46 providing an anchor post for the hinge 45. One end of the hinge 45 extends from the mirror platform 44, and the other end of the hinge 45 extends from the pedestal mounting cap 46. The pedestal mounting cap 46 can be a single element disposed at the intersection of the longitudinal and lateral central axes of the mirror platform 44 or a pair of elements disposed on opposite sides of the mirror platform 44 along the lateral or tilt axis of the mirror platform 44.

Stiffening bulkheads 47 and 48 are provided on the underside of each side of the mirror platform 44 to increase the stiffness thereof, and therefore decrease the curvature thereof. The bulkheads 47 and 48 can be laterally extending structures, longitudinally extending ribs, or a combination of both, e.g. longitudinally extending ribs extending from laterally extending structures. In a first embodiment, the mirror wafer 42 is formed in a single step backside etching process. The backside etching step forms the bulkheads 47 and 48 and the pedestal cap 46, along with defining the thickness of the main section of the mirror platform 44, and the hinge 45. The bulkheads 47 and 48 provide an improved stiffness/mass ratio as described earlier. An additional step can be added to adjust the thickness of the hinge 45 or the mirror platform 44, if the thickness of the hinge 45 is required to be different than the thickness of the mirror platform 44. A final topside etching step is conducted to define the hinge 45 separate from the pedestal cap 46.

Figure 5:
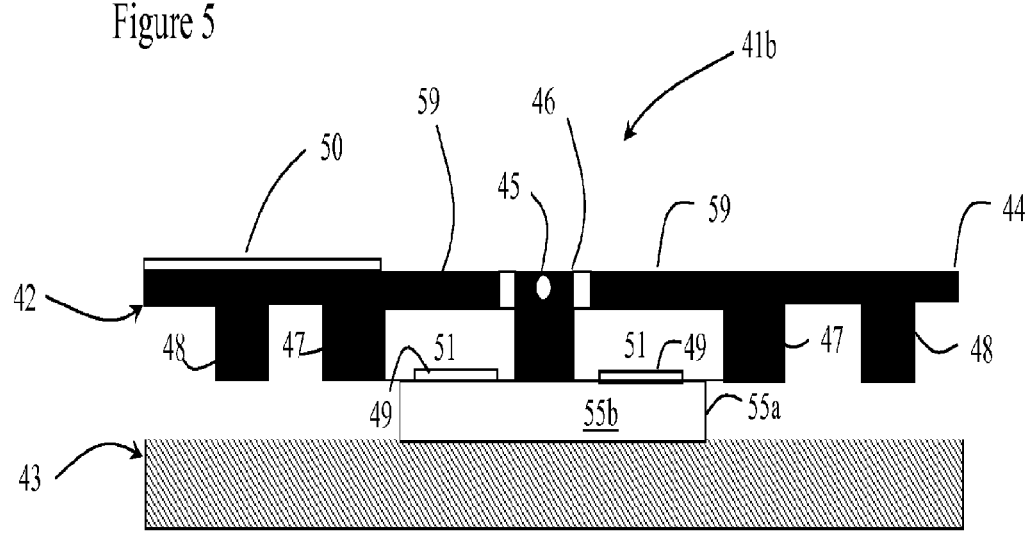
FIG. 5 is a cross-sectional view of another embodiment of a micro-mirror device in accordance with the present invention.
Figure 6:
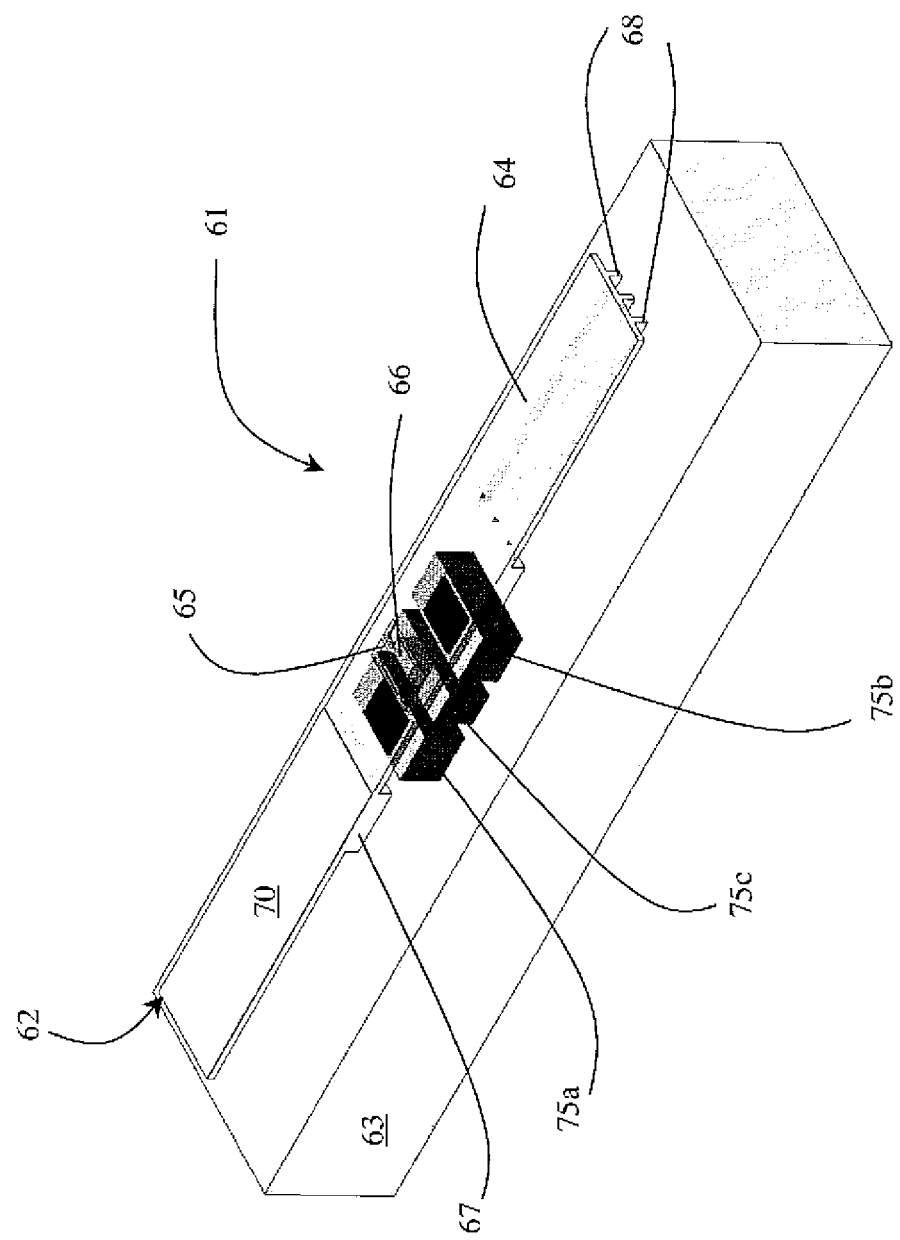
FIG. 6 is an isometric view of another embodiment of a micro-mirror device in accordance with the present invention.
Figure 7:
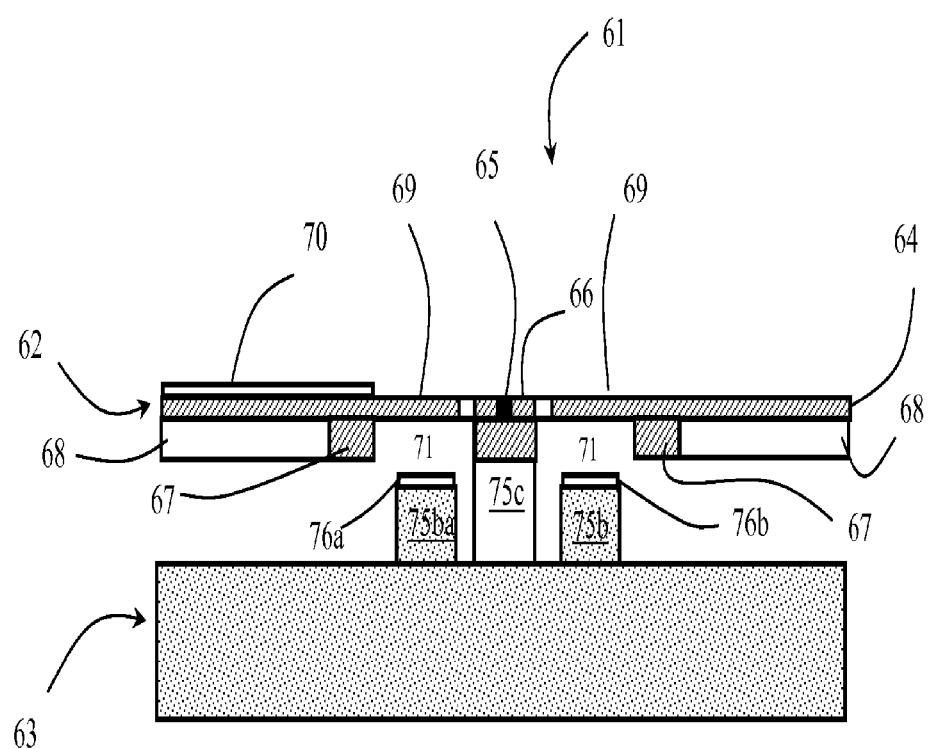
FIG. 7 is a cross-sectional view of the embodiment of FIG. 6.

The substrate wafer 43 is provided with a spacer or riser 55a extending upwardly from the main substrate 43 providing a raised section defining an upper level with a step down to the main substrate 43 at a lower level. The spacer 55a is formed in the substrate wafer 43, e.g. by an etching process. FIG. 5 illustrates an identical micro-mirror 41b, in which a spacer 55b is manufactured separately and bonded to the substrate wafer 43. Hot electrodes 49 are disposed on the spacer 55a and 55b below a relatively thin section 59 of the mirror platform 44 for selectively attracting the underside of the mirror platform 44, which act as ground electrodes, for tilting the mirror platform 44, as desired, e.g. for switching optical signals. A single hot electrode 49 can provide limited angular control; however, two or more hot electrodes 49 are preferred to ensure better control and a greater range of angular motion. The thin section 59 of the mirror platform 44 is formed above the spacers 55a and 55b, which forms the electrode gap 51. The hinges 45 are fabricated in the thin section 59, thereby preserving the compensation effect described earlier, at the same time achieving a stiffened mirror design. The stiffening bulkheads 47 and 48 are disposed above the main substrate 43 beyond the spacers 55a and 55b providing a swing gap (between the bulkheads 47 and 48 and the substrate wafer 43) independent of the electrode gap 51, and enabling the mirror platform 44 to rotate to a much larger rotation angle before hitting the lower main substrate wafer 43.

Ideally, a reflective surface 50 is disposed, e.g. coated, on an upper surface of the mirrored platform 44 for reflecting optical signals on one or both sides of the hinge 45. A structurally stiffer section of the mirror platform 44 is provided by means of the bulkheads 47 and 48, without penalizing mirror inertia; ideally the reflective coating 50 is provided only on the stiffer section of the mirror platform 44. Each of the hot electrodes 49 are electrically connected to an adjustable voltage source (not shown) for generating the required amount of voltage to tilt the mirror platform 44 relative to the substrate wafer 43 producing a desired angular position. The spacers 55a and 55b also support the pedestal cap 46, which is bonded thereon.

In this case the electrode gap 51 and the thickness of the hinge 45 are formed by the mirror etch process to preserve the aforementioned compensation effect, the spacer 55a or 55b enables the formation of the stiffening bulk heads 47 and 48 in the mirror platform 44, which is then free to swing to the desired angle through the swing gap independent of the spacer 55a or 55b. Moreover, the swing space of the mirror platform 44, i.e. between the ends of the mirror platform 44 and the substrate 43, is decoupled from the electrode gap 51, enabling flexibility in optimizing the electrode gap 51.

Accordingly, the thickness of the spacer 55a or 55b may be relatively large, e.g. 50 μm or more, therefore aerodynamic crosstalk due to pressure gradient created by the motion of the minor platform 44 squeezing the air film underneath is greatly alleviated by the larger swing gap.

A preferred embodiment of the present invention is depicted in FIGS. 6 to 9, which focuses on a single mirror device 61 in what would normally be an array or parallel micro-mirrors. The micro-minor device 61 includes a mirror wafer 62 and a substrate wafer 63. The mirror wafer 62 includes an elongate rectangular tilting mirror platform 64, a square pedestal mounting cap 66 forming an anchor post disposed at the intersection of the lateral and longitudinal central axes of the mirror platform 64, and a hinge 65 extending between the pedestal cap 66 and the mirror platform 64 along the lateral central axis of the minor platform 64. However, the hinge 65 can also extend out from the side of the mirror platform 64 to pedestal caps disposed on opposite sides of the mirror platform 64. Stiffening bulkheads 67 and 68 are provided on the underside of each side of the mirror platform 63 to increase the stiffness thereof, and therefore decrease the curvature thereof. The illustrated bulkheads 67 are laterally extending structures, while the illustrated bulkheads 68 are longitudinally extending ribs extending from the laterally extending structures 67 to the outer free ends of the mirror platform 64 parallel to the longitudinal axis thereof.

Figure 8:
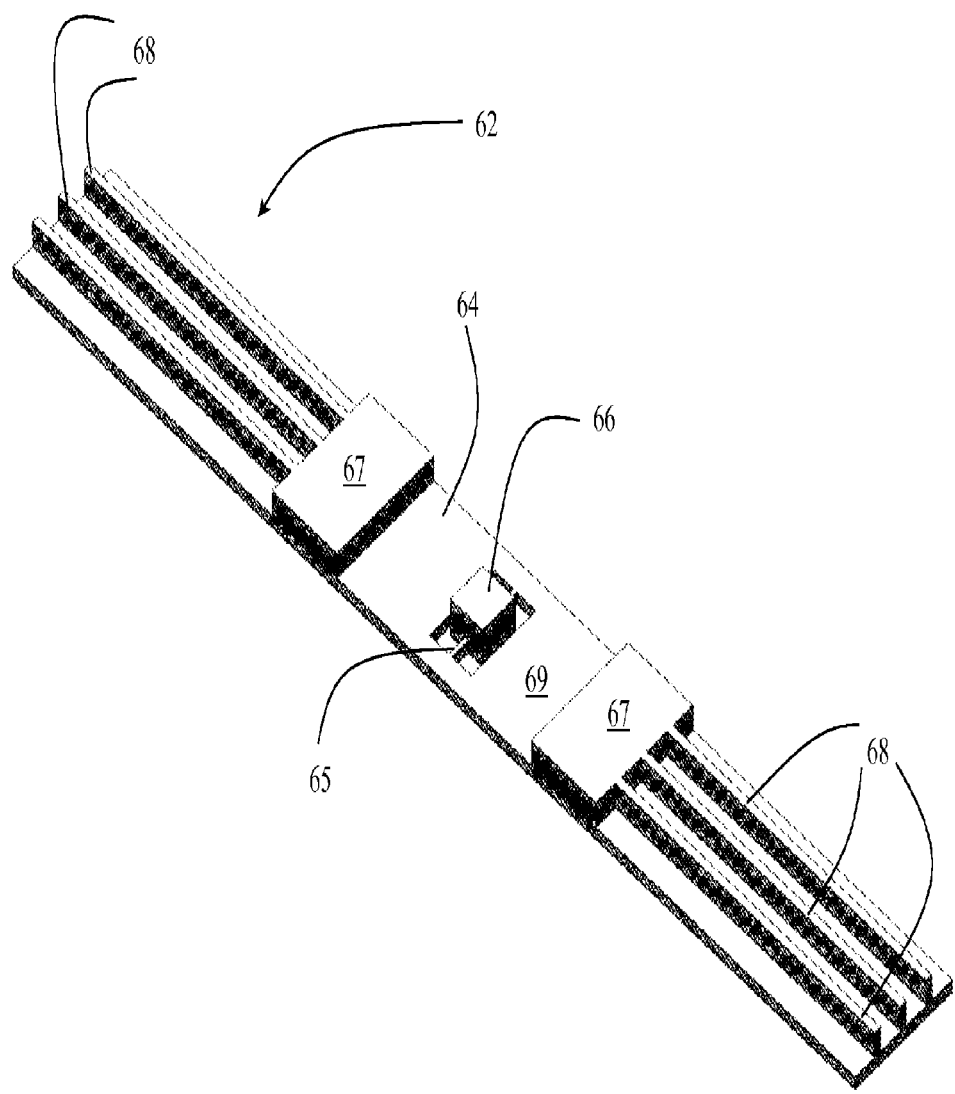
FIG. 8 is an isometric view of the mirror platform of the embodiment of FIGS. 6 and 7.

In a preferred embodiment, see FIG. 8, the mirror wafer 62 is formed in a single-step backside etching process. The etching step forms the bulkheads 67 and ribs 68 and the pedestal cap 66, along with defining the thickness of the main section of the mirror platform 64. A final topside etching step involves patterning and then etching the hinge 65 and around the pedestal cap 66.

Figure 9:
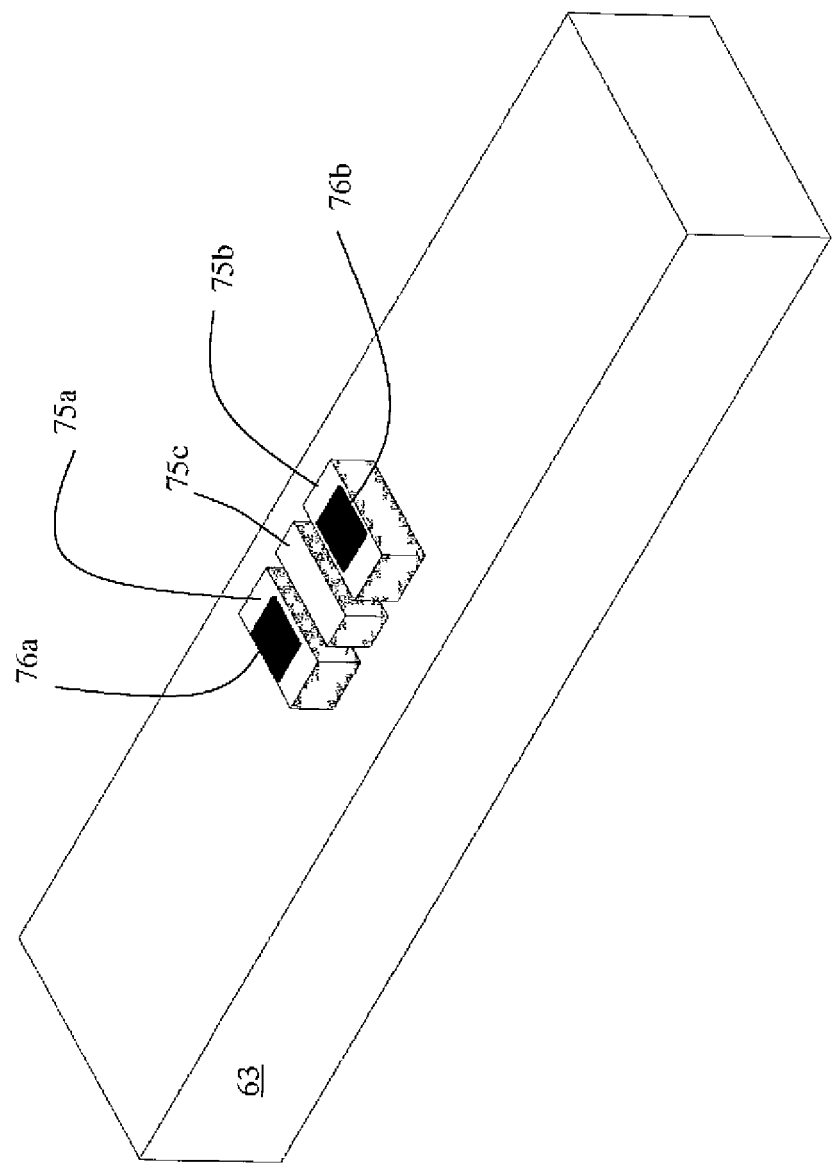
FIG. 9 is an isometric view of the substrate wafer of the embodiment of FIGS. 6 and 7.

The substrate wafer 63, see FIG. 9, is provided with a first spacer or riser 75a defining an upper level for a left hot electrode 76a, a second spacer or riser 75b extending to the upper level for a right hot electrode 76b, and a central spacer 75c for supporting the pedestal cap 66 extending upwardly from the base substrate wafer 63 providing raised sections with a step down to the lower level or the main substrate wafer 63. The single central spacer 75c can be replaced by a pair of spacers at either side of the mirror platform 64, as hereinbefore discussed. A single hot electrode 76a can provide limited angular control; however, two or more hot electrodes 76a and 76b are preferred to ensure better control and a greater range of angular motion of the mirror platform 64. Each of the electrode spacers 75a and 75b may comprise a conductive material, e.g. Silicon, in which case there is no need for a separate electrode layer. Alternatively, all the spacers 75a, 75b and 75c may comprise an insulator material, e.g. glass, in which case, the three separate spacers 75a, 75b and 75c may be substituted by a single spacer with patterned thin metal electrodes, with separate left and right hot electrode deposited thereon, as in FIGS. 5 and 6. The single spacer can be formed in the substrate wafer 63, e.g. by an etching process, while the individual spacers 75a, 75b and 75c are typically manufactured separately and bonded to the substrate wafer 63. Hot electrodes 76a and 76b are disposed on the spacer 75a and 75b below a relatively thin section 69 of the mirror platform 64, between the bulkheads 67 and the pedestal cap 66, for selectively attracting the underside of the mirror platform 64, which act as ground electrodes, for tilting the mirror platform 64, as desired, e.g. for switching optical signals. The thin section 69 of the mirror platform 64 is formed above the spacers 75a and 75b, which forms the electrode gap 71. The hinges 65 are fabricated in the thin section 69, thereby preserving the aforementioned compensation effect.

Ideally, a reflective surface 70 is disposed, e.g. coated, on an upper surface of the mirrored platform 64 on one or both sides of the hinge 65 for reflecting optical signals. A structurally stiffer section of the mirror platform 64 is provided by means of the bulkheads 67 and ribs 68, without penalizing mirror inertia, and ideally the reflective coating 70 is provided only on the stiffer section of the mirror platform 64 to minimize curvature thereof. Each of the hot electrodes 76a and 76b are electrically connected to separate adjustable voltage sources (not shown) for generating the required amount of voltage to tilt the mirror platform 64 relative to the substrate wafer 63 producing a desired angular position. The spacer 75c supports the pedestal cap 66, which is bonded thereon.

In this case the electrode gap 71 and the thickness of the hinge 65 are formed by the single backside mirror etch, hence preserving the compensation effect, at the same time providing stiffened mirror design. The mirror swing space is increased by using the spacer 75a, and thereby decouples the swing space from the electrode gap 71 providing design degree of freedom for the electrode 76a.

Design of the bulkheads 67 and ribs 68 involves a compromise between mirror inertia and mirror stiffness. As an example, a 30 μm thick mirror wafer 62 with a 20 μm etch to define the bulkheads 67 and ribs 68, and including 100 μm long bulkheads 67, and 500 μm long ribs 68 provides approximately three times the improvement in mirror stiffness, as compared to a uniformly thick 15 um mirror platform with equivalent mass moment of inertia.

An apparent solution to increase the bending stiffness without increasing mirror inertia excessively is to add ribs 68 underneath the mirror platform 64. The approach involves a relatively thin mirror base and relatively thick ribs 68 as depicted in FIG. 8. The hinges 65 may be fabricated in the thin region. In one implementation, the electrode gap 71 may be formed by etching the substrate wafer 63, and the ribbed mirror 64 is formed by etching the mirror wafer 62; in this case the electrode gap/hinge height compensation is totally lacking (FIG. 2a). Alternatively, the mirror 64 may be etched twice to provide both electrode gap and thin regions; in this case the electrode gap/hinge height compensation is mostly lacking (FIG. 2b), also suffering from complexity of a two-mask mirror process.

I claim:

1. A micro-mirror device comprising:
    a substrate defining a lower level;
    a first spacer extending upwardly from the substrate forming an upper level;
    an anchor post extending upwardly from the substrate or the spacer;
    a tilting platform, having a longitudinal central axis, and pivotally connected to the anchor post above the substrate via a hinge defining a lateral tilting axis, perpendicular to and shorter than the longitudinal central axis, the tilting platform including a first thin section adjacent to the tilting axis above the upper level of the substrate, and a stiffer section at each outer free end of the longitudinal central axis including stiffening ribs in a lower surface thereof above the lower level of the substrate beyond the first spacer for decreasing curvature of the outer free ends of the tilting platform defining a swing space therebetween; and
    a first hot electrode on the first spacer below the first thin section only, the first hot electrode and the thin section of the tilting platform defining an electrode gap, separated from the swing space, for pivoting the tilting platform about the tilting axis,
whereby tolerance variations in hinge thickness are at least partially compensated for by a corresponding variation in electrode gap; and
whereby the swing space is wider than and independent of the electrode gap.

2. The micro-mirror device according to claim 1, wherein the substrate and the first spacer are comprised in a single wafer.

3. The micro-mirror device according to claim 1, wherein the first spacer is comprised of a different material bonded on top of the substrate.

4. The micro-mirror device according to claim 3, wherein the first spacer comprises a conductive material, wherein the first spacer includes the first hot electrode.

5. The micro-mirror device according to claim 1, wherein the first spacer comprises an insulator material; and further comprising a second hot electrode on the first spacer, below a second thin section in the tilting platform, on an opposite side of the titling axis than the first hot electrode.

6. The micro-mirror device according to claim 1, further comprising a second spacer extending upwardly from the substrate to the upper level; and a second hot electrode of the second spacer below a second thin section of the tilting platform, on an opposite side of the tilting axis than the first hot electrode.

7. The micro-mirror device according to claim 1, wherein the stiffening ribs include a bulkhead extending laterally from one side of the tilting platform to another parallel to the tilting axis.

8. The micro-mirror device according to claim 7, wherein the stiffening ribs also include a plurality of elongated ribs extending from the bulkhead to the outer free end of the tilting platform perpendicular to the tilting axis.

9. The micro-mirror device according to claim 8, wherein the tilting platform includes a mounting cap for bonding on top of the anchor post; and wherein the mounting cap, the bulkhead and the elongated ribs are formed in a single structure and have the same thickness.

10. The micro-mirror device according to claim 1, wherein the stiffening ribs include a plurality of elongated ribs extending to the outer free end of the titling platform perpendicular to the tilting axis.

11. The micro-mirror device according to claim 1, wherein the first spacer extends upwardly from the substrate to provide improved aerodynamic cross-talk by increased effective thickness of air gap underneath the tilting platform.

12. The micro-mirror device according to claim 1, further comprising a reflective surface on the tilting platform only above one or both of the stiffer sections.

* * * * *

UNITED STATES PATENT AND TRADEMARK OFFICE
CERTIFICATE OF CORRECTION

| | |
|---|---|
| PATENT NO. | : 8,665,506 B2 |
| APPLICATION NO. | : 12/969669 |
| DATED | : March 4, 2014 |
| INVENTOR(S) | : Moidu |

It is certified that error appears in the above-identified patent and that said Letters Patent is hereby corrected as shown below:

In the Specification

Column 4, line 5, "similar elements to micro-minor 11"
   should read    --similar elements to micro-mirror 11--

Column 5, line 35, "minor platform 44 squeezing"
   should read    --mirror platform 44 squeezing--

Column 5, line 40, "The micro-minor device 61 includes"
   should read    --The micro-mirror device 61 includes--

Column 5, line 47, "central axis of the minor platform 64."
   should read    --central axis of the mirror platform 64.--

Signed and Sealed this
Thirtieth Day of September, 2014

Michelle K. Lee
*Deputy Director of the United States Patent and Trademark Office*